(12) United States Patent
Valladolid et al.

(10) Patent No.: US 12,307,593 B2
(45) Date of Patent: *May 20, 2025

(54) SYSTEMS AND METHODS FOR FINE ADJUSTMENT OF ROOF MODELS

(71) Applicant: Insurance Services Office, Inc., Jersey City, NJ (US)

(72) Inventors: Raúl Cabido Valladolid, Alcorcón (ES); Juan Carlos Nuñez Moreno, San Pedro de Alcántara (ES); Javier Sánchez Egido, Alcorcón (ES)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,852

(22) Filed: May 16, 2023

(65) Prior Publication Data

US 2023/0290056 A1    Sep. 14, 2023

Related U.S. Application Data

(63) Continuation of application No. 17/355,845, filed on Jun. 23, 2021, now Pat. No. 11,651,552.

(Continued)

(51) Int. Cl.
*G06T 17/05*   (2011.01)
*G06F 16/41*   (2019.01)
(Continued)

(52) U.S. Cl.
CPC ............. *G06T 17/05* (2013.01); *G06F 16/41* (2019.01); *G06T 7/60* (2013.01); *G06T 19/006* (2013.01);
(Continued)

(58) Field of Classification Search
CPC ......... G06T 7/60; G06T 17/05; G06T 19/006; G06T 19/20; G06T 2207/10032; G06T 2219/2004; G06F 16/41
See application file for complete search history.

(56) References Cited

U.S. PATENT DOCUMENTS

| 9,305,235 | B1 | 4/2016 | Bogan et al. |
| 11,651,552 | B2 | 5/2023 | Valladolid et al. |

(Continued)

FOREIGN PATENT DOCUMENTS

WO    2020/150815 A1    7/2020

OTHER PUBLICATIONS

International Search Report of the International Searching Authority mailed on Sep. 24, 2021, issued in connection with International Application No. PCT/US2021/038662 (3 pages).

(Continued)

*Primary Examiner* — Daniel F Hajnik
*Assistant Examiner* — Jed-Justin Imperial
(74) *Attorney, Agent, or Firm* — McCarter & English, LLP

(57) ABSTRACT

Systems and methods for fine adjustment of computerized roof models are provided. The system generates a 3D roof structure model based on at least one image obtained from an aerial imagery database. Alternatively, the system could retrieve at least one stored 3D roof structure model from a 3D roof structure model database. The system weighs (e.g., scores) each 3D roof structure model candidate and determines an optimal 3D roof structure model by applying a variable neighborhood search to a 3D roof structure model candidate having a highest confidence score among the weighed 3D roof structure model candidates.

12 Claims, 17 Drawing Sheets

Related U.S. Application Data

(60) Provisional application No. 63/042,813, filed on Jun. 23, 2020.

(51) Int. Cl.
  G06T 7/60 (2017.01)
  G06T 19/00 (2011.01)
  G06T 19/20 (2011.01)

(52) U.S. Cl.
  CPC .... G06T 19/20 (2013.01); *G06T 2207/10032* (2013.01); *G06T 2219/2004* (2013.01)

(56) References Cited

U.S. PATENT DOCUMENTS

| | | | |
|---|---|---|---|
| 2012/0179431 | A1 | 7/2012 | Labrie et al. |
| 2014/0015813 | A1* | 1/2014 | Numaguchi .......... G06F 3/0346 345/184 |
| 2014/0212028 | A1 | 7/2014 | Ciarcia |
| 2015/0006117 | A1 | 1/2015 | Zhang et al. |
| 2017/0273614 | A1* | 9/2017 | Giphart ................ A61B 6/5217 |
| 2019/0213412 | A1 | 7/2019 | Kottenstette et al. |
| 2019/0220711 | A1 | 7/2019 | Taylor et al. |
| 2019/0384866 | A1* | 12/2019 | Porter ..................... G06F 30/17 |
| 2019/0385363 | A1 | 12/2019 | Porter et al. |
| 2021/0398346 | A1 | 12/2021 | Valladolid et al. |

OTHER PUBLICATIONS

Written Opinion of the International Searching Authority mailed on Sep. 24, 2021, issued in connection with International Application No. PCT/US2021/038662 (7 pages).

Office Action dated Mar. 28, 2022, issued in connection with U.S. Appl. No. 17/355,845 (12 pages).

Dorigo, et al., "Ant Colony Optimization," IEEE Computational Intelligence Magazine, Nov. 2006 (12 pages).

Feo, et al. "A Probabilistic Heuristic for a Computationally Difficult Set Covering Problem," Operations Research Letters, Apr. 1989 (5 pages).

Grompone von Gioi, et al., "LSD: a Line Segment Detector", Image Processing On Line (2012) (21 pages).

Glover, "Heuristics for Integer Programming Using Surrogate Constraints, " Decision Sciences (1977) (11 pages).

Hansen, et al., "Variable Neighborhood Search: Principles and Applications", European Journal of Operational Research (2001) (19 pages).

Ingber, "Simulated Annealing: Practice Versus Theory", Mathl. Comput. Modelling. vol. 18, No. 11 (1993) (29 pages).

Man, et al., "Genetic Algorithms: Concepts and Applications,". IEEE Transactions on Industrial Electronics, vol. 43, No. 5, Oct. 1996 (16 pages).

Mladenovic, et al., "Variable Neighborhood Search," Computers and Operations Research, vol. 24, No. 11 (1997) (4 pages).

Moscato, "On Evolution, Search, Optimization, Genetic Algorithms and Martial Arts: Towards Memetic Algorithms,". Caltech Concurrent Computation Program (1989) (68 pages).

Xie, et al., "Holistically-Nested Edge Detection," International Journal on Computer Vision (2017) (16 pages).

Lourenco, et al., "Iterated Local Search: Framework and Applications. Handbook of Metaheuristics," International Series in Operations Research & Management Science (2010) (37 pages).

Resende, et al., "Scatter Search and Path-Relinking: Fundamentals, Advances, and Applications," Handbook of Metaheuristics (2010) (23 pages).

Glover, et al., "Tabu Search," Kluwer Academic Publishers (1997) (394 pages).

Notice of Allowance mailed Oct. 11, 2022, issued in connection with U.S. Appl. No. 17/355,845 (8 pages).

Notice of Allowance mailed Jan. 10, 2023, issued in connection with U.S. Appl. No. 17/355,845 (9 pages).

Jung, et al., "A Line-Based Progressive Refinement of 3D Rooftop Models Using Airborne LiDAR Data with Single View Imagery," ISPRS Journal of Photogrammetry and Remote Sensing (2019) (19 pages).

Extended European Search Report dated Jul. 2, 2024, issued by the European Patent Office in connection with European Patent Application No. 21828831.4 (9 pages).

* cited by examiner

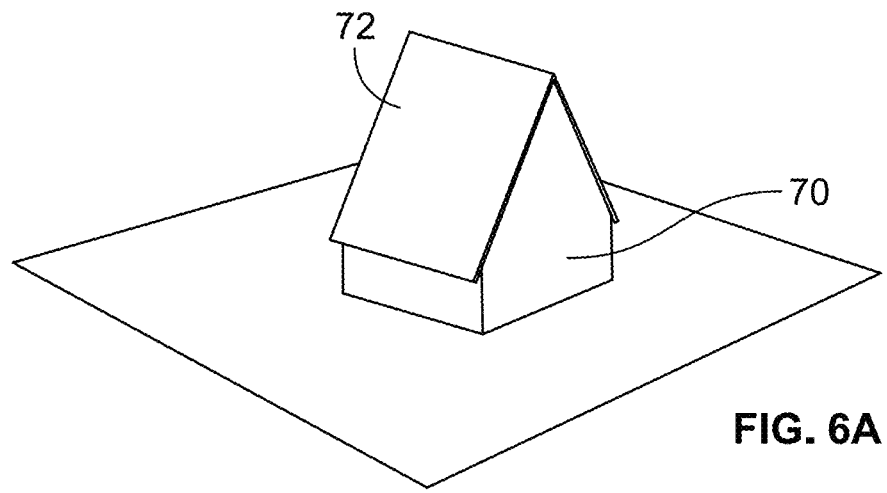
FIG. 6A
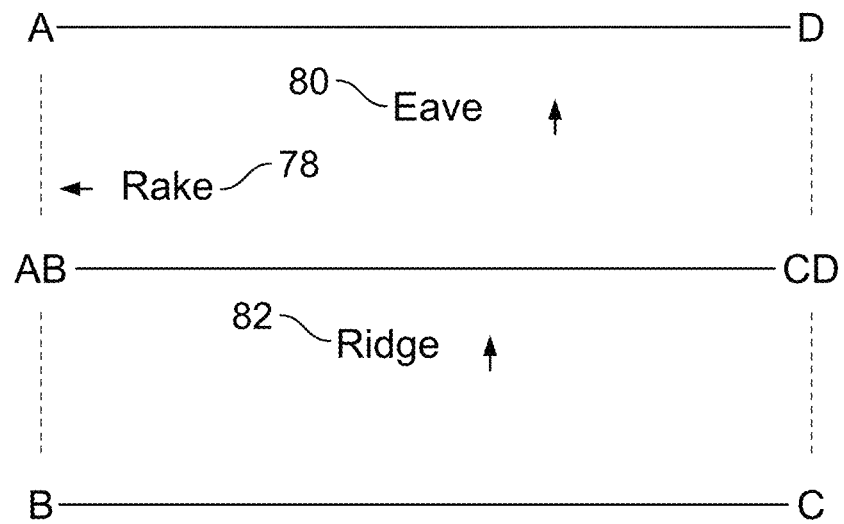
FIG. 6B
$$[x_{AB}, y_{AB}, z_{AB}, a, 1, W, z_{Eave}]$$
FIG. 6C

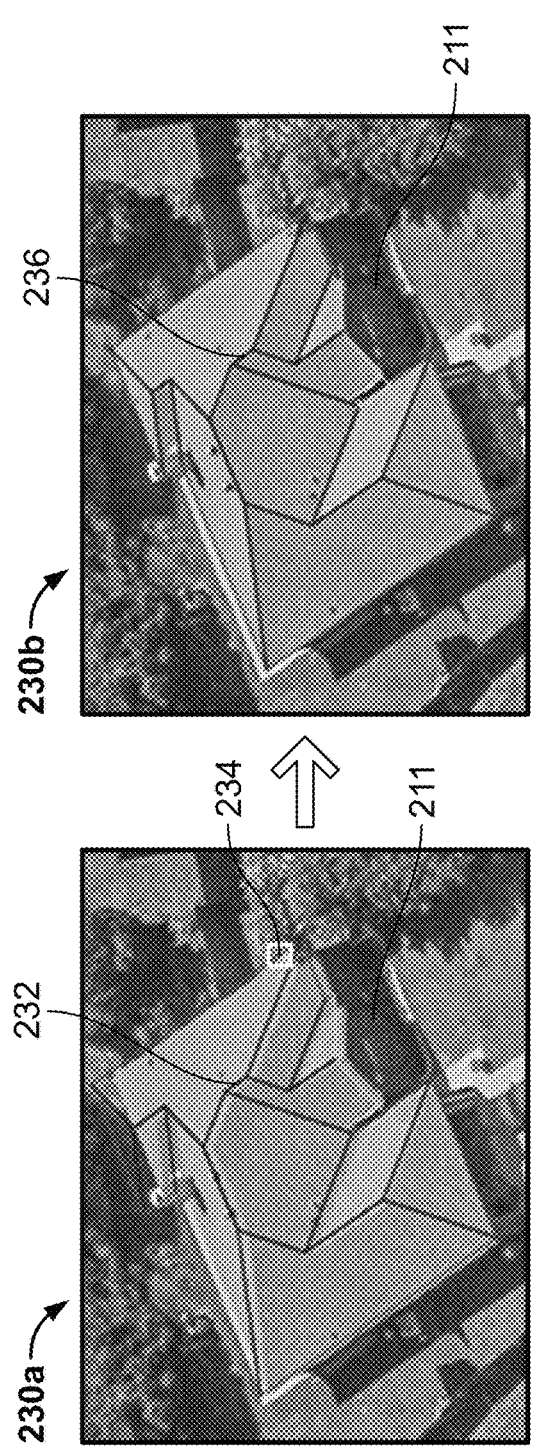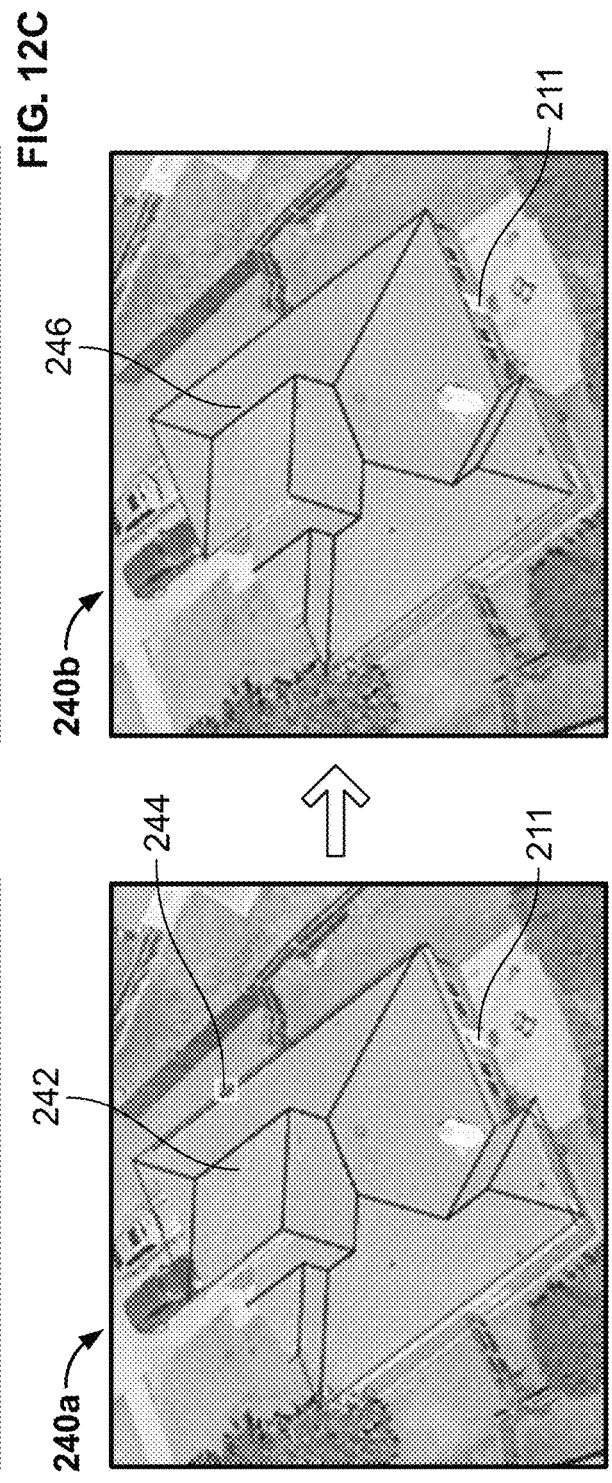
FIG. 12C
FIG. 12D

SYSTEMS AND METHODS FOR FINE ADJUSTMENT OF ROOF MODELS

BACKGROUND

Related Applications

This application is a continuation of U.S. application Ser. No. 17/355,845 filed on Jun. 23, 2021, now U.S. Pat. No. 11,651,552 issued on May 16, 2023, which claims priority to U.S. Provisional Patent Application Ser. No. 63/042,813 filed on Jun. 23, 2020, the entire disclosures of which is hereby expressly incorporated by reference.

TECHNICAL FIELD

The present disclosure relates generally to the field of computer modeling of structures. More particularly, the present disclosure relates to systems and methods for fine adjustment of roof models.

RELATED ART

Accurate and rapid identification and depiction of objects from digital images (e.g., aerial images, satellite images, etc.) is increasingly important for a variety of applications. For example, information related to various features of buildings, such as roofs, walls, doors, etc., is often used by construction professionals to specify materials and associated costs for both newly-constructed buildings, as well as for replacing and upgrading existing structures. Further, in the insurance industry, accurate information about structures may be used to determine the proper costs for insuring buildings/structures.

Various software systems have been implemented to process aerial images and/or overlapping image content of an aerial image pair to generate a three-dimensional (3D) model of a building present in the images and/or a 3D model of the structures thereof (e.g., a roof structure). However, these systems have drawbacks, such as missing camera parameter set information associated with each aerial image and an inability to provide a higher resolution estimate of a position of each aerial image (where the aerial images overlap) to provide a smooth transition for display or computation. This may result in an inaccurate 3D roof structure model that consequently does not substantially align with a roof structure present in each aerial image. As such, the ability to refine one or more parameters of a 3D roof structure model to optimize a position and/or orientation of a 3D roof structure model projected onto an aerial image is a powerful tool.

Thus, what would be desirable is a system that automatically and efficiently refines one or more parameters of a 3D roof structure model to optimize a position and/or orientation of a 3D roof structure model on an aerial image. Accordingly, the systems and methods disclosed herein solve these and other needs.

SUMMARY

This present disclosure relates to systems and methods for fine adjustment of roof models. The system generates a 3D roof structure model based on at least one image obtained from an aerial imagery database. Alternatively, the system could retrieve at least one stored 3D roof structure model from a 3D roof structure model database. The system weighs (e.g., scores) each 3D roof structure model candidate and determines an optimal 3D roof structure model by applying a variable neighborhood search to a 3D roof structure model candidate having a highest confidence score among the weighed 3D roof structure model candidates.

BRIEF DESCRIPTION OF THE DRAWINGS

The foregoing features of the invention will be apparent from the following Detailed Description of the Invention, taken in connection with the accompanying drawings, in which:

FIGS. 6A-6C are diagrams illustrating the parametric roof representation of a gable roof;

FIGS. 12A-12D are diagrams illustrating 3D model optimization processing results generated by the system of the present disclosure;

DETAILED DESCRIPTION

The present disclosure relates to systems and methods for improved modeling of roof structures, as described in detail below in connection with FIGS. 1-14. The embodiments described below are related to the optimization of a 3D roof structure model projected onto an image, including, but not limited to, a two-dimensional aerial or satellite image, a three-dimensional image, a three-dimensional point cloud, a three-dimensional light detection and ranging (LiDAR) point cloud, etc.

By way of background, a 3D roof structure model can be inferred from a plurality of images and/or a plurality of three-dimensional constructs, such as point clouds or LiDAR data. For example, a 3D roof structure model can be constructed based on features of a roof structure present in a plurality of input images. In complex scenarios, the constructed 3D roof structure model can comprise errors such that the 3D roof structure model does not substantially align with the plurality of input images. To mitigate this issue, at least one parameter of the constructed 3D roof structure model can be refined to adjust the 3D roof structure model and improve an alignment thereof with each input image. In particular, a metaheuristic-based approach can be utilized to minimize an adjustment error of the 3D roof structure model during a final step of a 3D model construction process.

Figure 1:
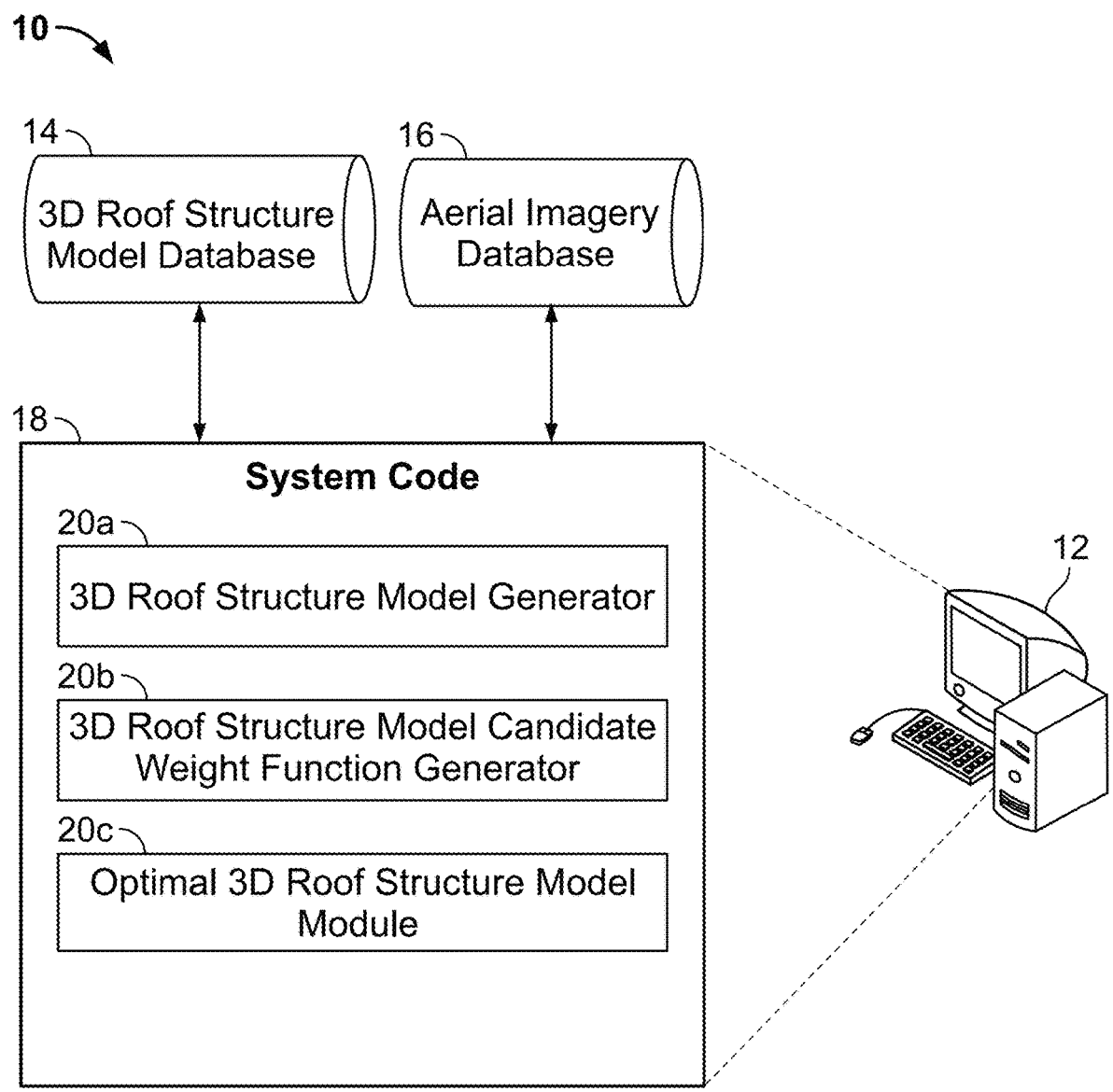
FIG. 1 is a diagram illustrating hardware and software components capable of being utilized to implement the system of the present disclosure.
Figure 11:
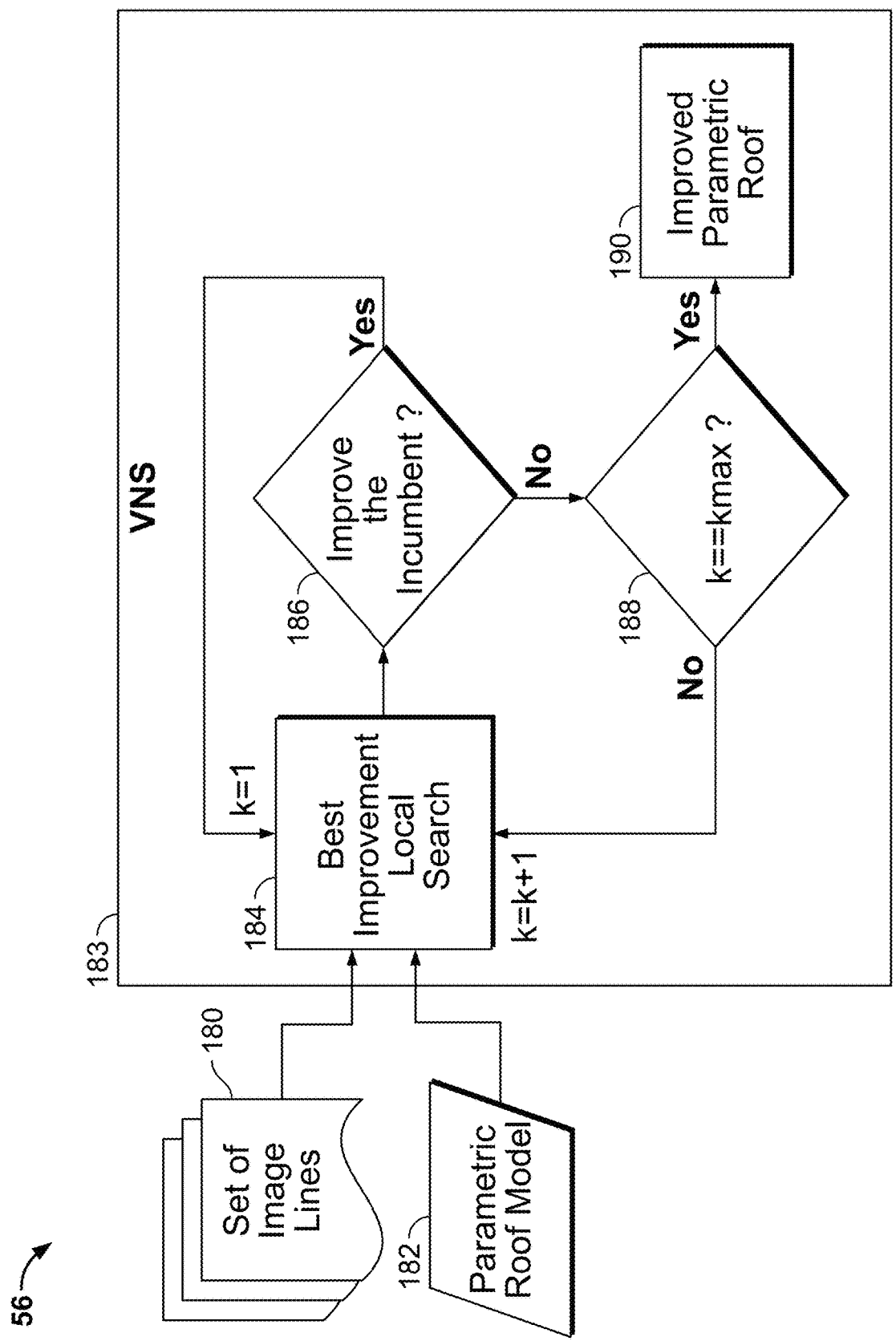
FIG. 11 is a flowchart illustrating step 56 of FIG. 4 in greater detail.

Referring to FIG. 1, the system 10 of the present disclosure provides for minimizing an adjustment error of a 3D roof structure model. In particular, the system 10 weighs (e.g., scores) a plurality of 3D roof structure model candidates and applies a variable neighborhood search 183 (as shown in FIG. 11) to a 3D roof structure model candidate having a highest score to optimize the 3D roof structure model candidate. FIG. 1 is a diagram illustrating hardware and software components capable of being utilized to implement the system 10 of the present disclosure. The system 10 could be embodied as a central processing unit 12 (e.g., a hardware processor) coupled to a 3D roof structure model database 14 and/or an aerial imagery database 16. The system 10 could retrieve at least one stored 3D roof structure model candidate from the 3D roof structure model database 14. Alternatively, and as discussed below, the system 10 could generate at least one 3D roof structure model candidate based on at least one image obtained from the aerial imagery database 16. The aerial imagery database 16 could include digital images and/or digital image datasets comprising aerial images, satellite images, etc. Further, the datasets could include, but are not limited to, images of residential and commercial buildings. Even further, the database 16 could store one or more three-dimensional representations of an imaged location (including structures at the location), such as point clouds, LiDAR files, etc., and the system could operate with such three-dimensional representations. As such, by the terms "image" and "imagery" as used herein, it is meant not only optical imagery (including aerial and satellite imagery), but also three-dimensional imagery and computer-generated imagery, including, but not limited to, LiDAR, point clouds, three-dimensional images, etc.

Figure 2A:
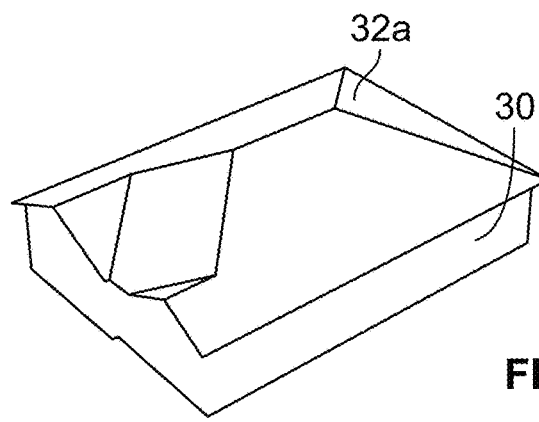
FIGS. 2A-2C are diagrams illustrating a 3D model of a roof structure, a projection of the 3D model onto an input image, and an optimized projection of the 3D model onto the input image.
Figure 2B:
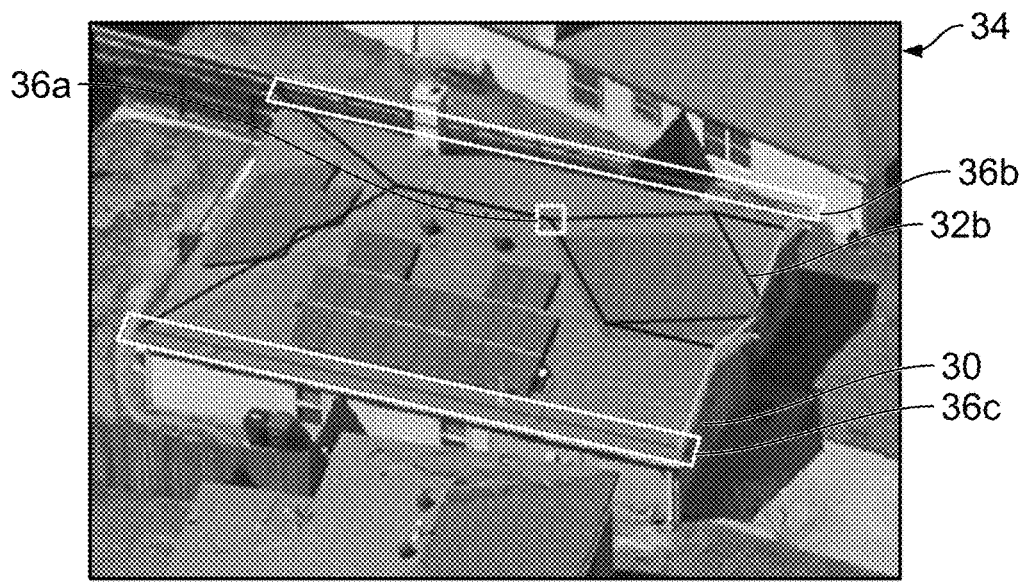
Figure 2C:
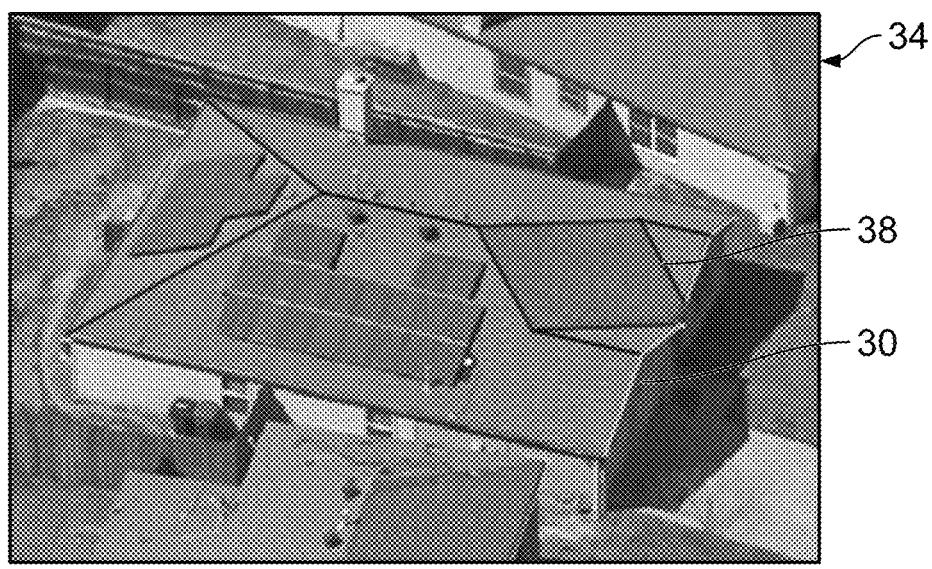

The hardware processor 12 executes system code which generates and optimizes a 3D roof structure model candidate based on at least one aerial image, point cloud, LiDAR file, etc., received from the aerial imagery database 16. For example, FIGS. 2A-C respectively illustrate the generation and optimization of a 3D roof structure model candidate. In particular, FIG. 2A illustrates a generated 3D roof structure model candidate 32a of a building 30 and FIG. 2B illustrates a 3D roof structure wireframe model 32b (corresponding to model 32a) projected onto the building 30 present in an input image 34. It is noted that the wireframe could also be projected onto a three-dimensional representation of the building, such as a point cloud or a LiDAR data. As shown in FIG. 2B, line segments 36a, 36b, and 36c illustrate that the 3D roof structure wireframe model 32b is misaligned with the input image 34. Accordingly, and as shown in FIG. 2C, the system 10 generates and optimizes, based on the 3D roof structure wireframe model 32b, a 3D roof structure wireframe model 38 that is aligned with the input image 34. It is noted that the hardware processor could include, but is not limited to, a personal computer, a laptop computer, a tablet computer, a smart telephone, a server, and/or a cloud-based computing platform.

Referring back to FIG. 1, the system 10 includes system code 18 (i.e., non-transitory, computer-readable instructions) stored on a computer-readable medium and executable by the hardware processor 12 or one or more computer systems. The code 18 could include various custom-written software modules that carry out the steps/processes discussed herein, and could include, but is not limited to, a 3D roof structure model generator 20a, a 3D roof structure model candidate weight function generator 20b and an optimal 3D roof structure model module 20c. The code 18 could be programmed using any suitable programming languages including, but not limited to, C, C++, C#, Java, Python or any other suitable language. Additionally, the code 18 could be distributed across multiple computer systems in communication with each other over a communications network, and/or stored and executed on a cloud computing platform and remotely accessed by a computer system in communication with the cloud platform. The code 18 could communicate with the 3D roof structure model database 14 and/or aerial imagery database 16, which could be stored on the same computer system as the code 18, or on one or more other computer systems in communication with the code 18.

Still further, the system 10 could be embodied as a customized hardware component such as a field-programmable gate array ("FPGA"), application-specific integrated circuit ("ASIC"), embedded system, or other customized hardware components without departing from the spirit or scope of the present disclosure. It should be understood that FIG. 1 is only one potential configuration, and the system 10 of the present disclosure can be implemented using a number of different configurations.

Figure 3A:
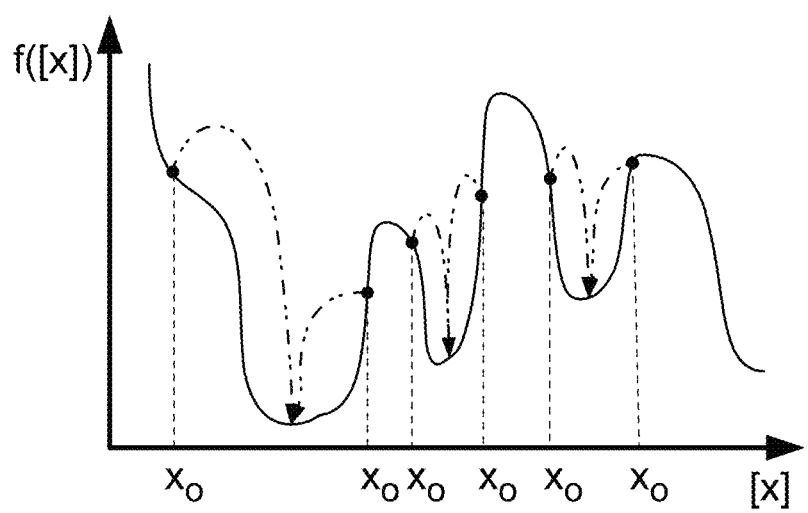
FIGS. 3A-3C are graphs illustrating different strategies utilized by a trajectory-based metaheuristic methods.
Figure 3B:
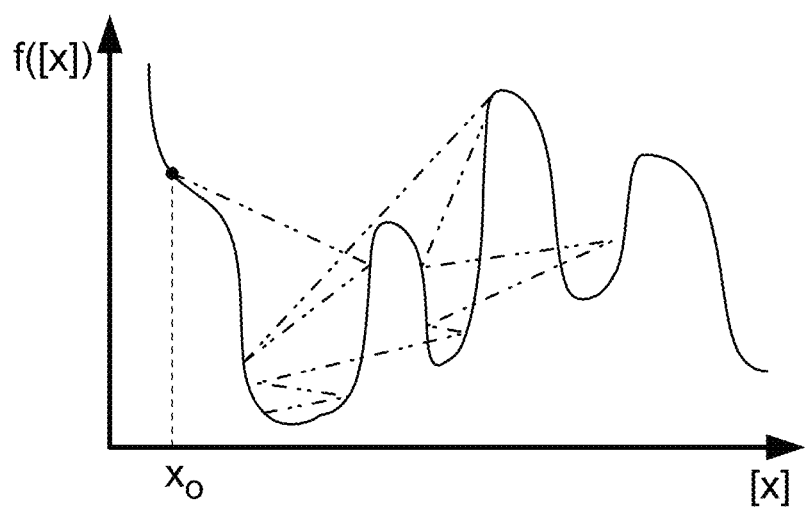
Figure 3C:
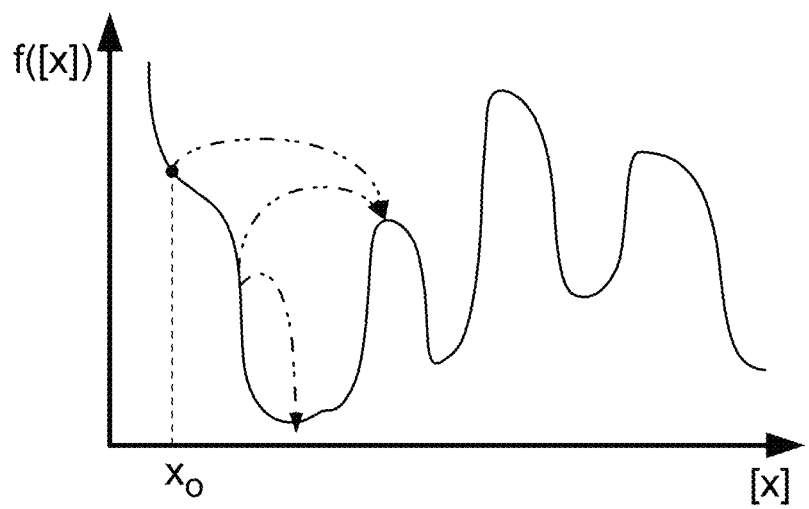

As described in further detail below, the system 10 utilizes a metaheuristic method to optimize a 3D roof structure model candidate. In particular, the system 10 utilizes a variable neighborhood search (VNS) metaheuristic method. A metaheuristic method is a high-level procedure designed to find, generate, or select a heuristic (partial search algorithm) that may provide a solution to an optimization problem, especially with incomplete or imperfect data or limited computational capacity. Example metaheuristic methods include, but are not limited to, Ant Colony Optimization (ACO), Evolutionary Algorithms (EA) which includes Genetic Algorithms (GA) and Memetic Algorithm (MA), Greedy Randomized Adaptive Search (GRASP), Iterated Local Search (ILS), Path Relinking (PR), Simulated Annealing (SA), Scatter Search (SS), Tabu Search (TS) and VNS. VNS is considered a trajectory-based metaheuristic method because the search process follows a trajectory in the solution space. Therefore, given a candidate solution (i.e., an initial solution) a trajectory-based method is able to define a trajectory in the search space using movement operations. The followed trajectory can reveal information about the behavior and effectiveness of the algorithm. FIGS. 3A-3C are graphs illustrating different strategies utilized by trajectory-based metaheuristic methods to avoid local optima when endeavoring to reach a global optimum. In particular, FIG. 3A illustrates a multi-start search, FIG. 3B illustrates a random search, and FIG. 3C illustrates a deterministic search.

VNS avoids a local optimum by changing a neighborhood structure where a local search procedure is applied. Accordingly, VNS can manage a set of neighborhood structures. Different VNS implementations are known but the VNS metaheuristic algorithm introduced by Pierre Hansen in 2001 comprises the following:

Initialization: select a set of neighborhood structures $N_k(k=1, \ldots k_{max})$, find an initial solution x, set k=1, choose a stopping condition, Step 1 (shaking stage): Generate $x' \in N_k(x)$ randomly;

Step 2 (local search): Apply a local search method starting with x' to find local optimum x"; and Step 3 (move or not): If x" is better than the incumbent, then set x=x" and k=1, otherwise set k=k+1 (or if k=$k_{max}$ set k=1); and return to Step 1.

The local search procedure of Step 2 refers to a heuristic algorithm which endeavors to improve a candidate solution. In particular, a local search algorithm commences from a candidate solution and subsequently advances to improved candidate solutions following an iterative process. The process ends when an improved candidate solution cannot be further improved. Different local search procedures are known including, but not limited to, the first improvement local search procedure and the best improvement local search procedure. The first improvement local search procedure selects a candidate solution, explores a neighborhood of the candidate solution and selects a first movement that realizes an improvement over the candidate solution. In contrast, the best improvement local search procedure selects a candidate solution, evaluates all possible solutions in a neighborhood of the candidate solution and selects the best solution among the possible solutions. Each of the first improvement local search procedure and the best improvement local search procedure end when the solution cannot be further improved.

The application of VNS to transform a local minimum 3D roof structure model into an optimal 3D roof structure model requires a parametric representation of a roof structure to represent it as an n-dimensional variable and a defined weight function which provides for comparing 3D roof structure model candidates to determine a best 3D roof structure model candidate. Generating a parametric representation of a roof structure and defining a weight function will respectively be discussed in further detail below in reference to FIGS. 5 and 6A-6C and FIGS. 8-10E.

Figure 4:
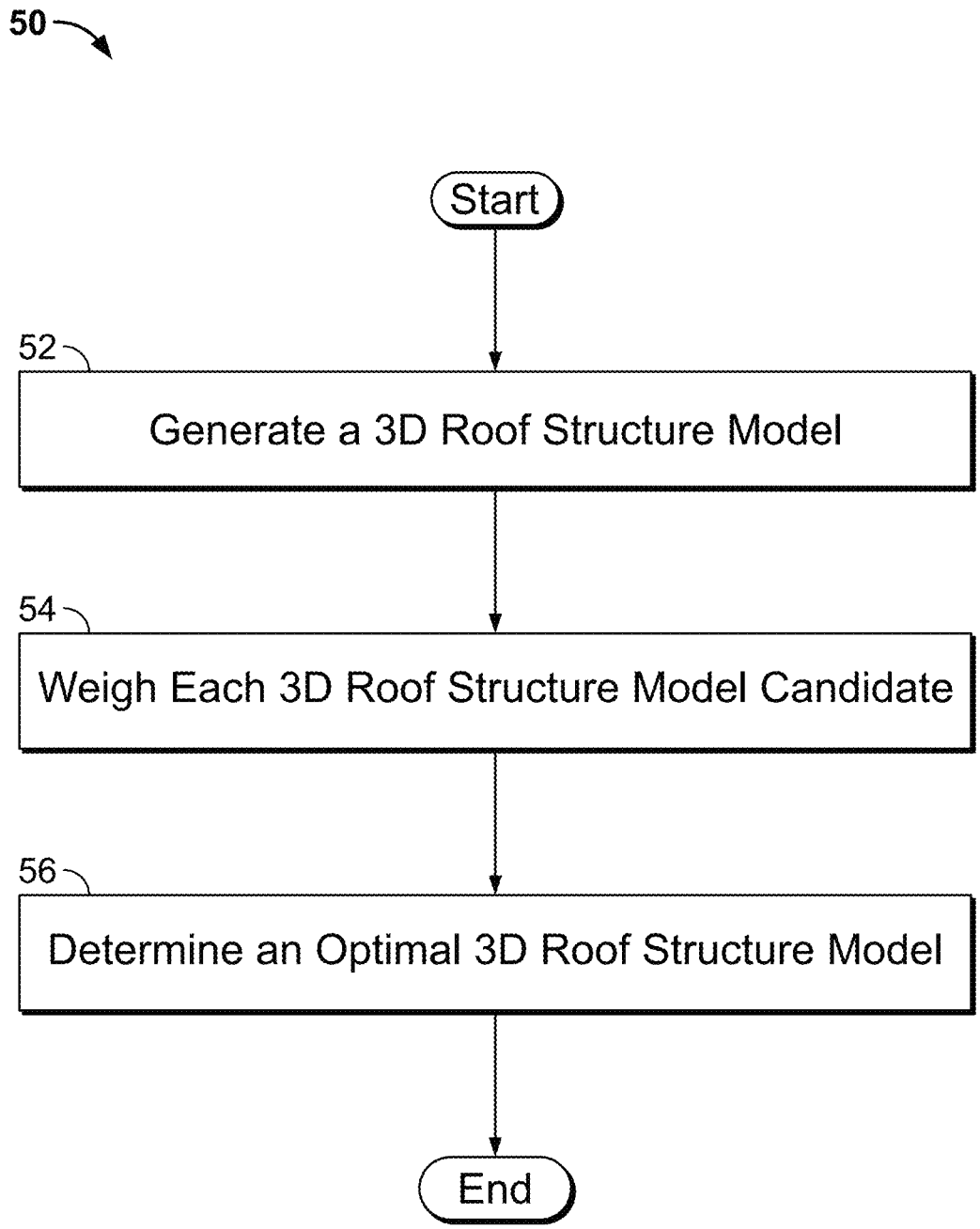
FIG. 4 is a flowchart illustrating overall processing steps carried out by the system of the present disclosure.

FIG. 4 is a flowchart illustrating overall processing steps 50 carried out by the system 10 of the present disclosure. Beginning in step 52, the system 10 generates a 3D roof structure model. The system 10 could generate the 3D roof structure model based on at least one image obtained from the aerial imagery database 16. Alternatively, the system 10 could retrieve at least one stored 3D roof structure model from the 3D roof structure model database 14. Then, in step 54, the system weighs each 3D roof structure model candidate. Lastly, in step 56, the system 10 determines an optimal 3D roof structure model based on a best 3D roof structure model candidate among the weighed 3D roof structure model candidates.

Figure 5:
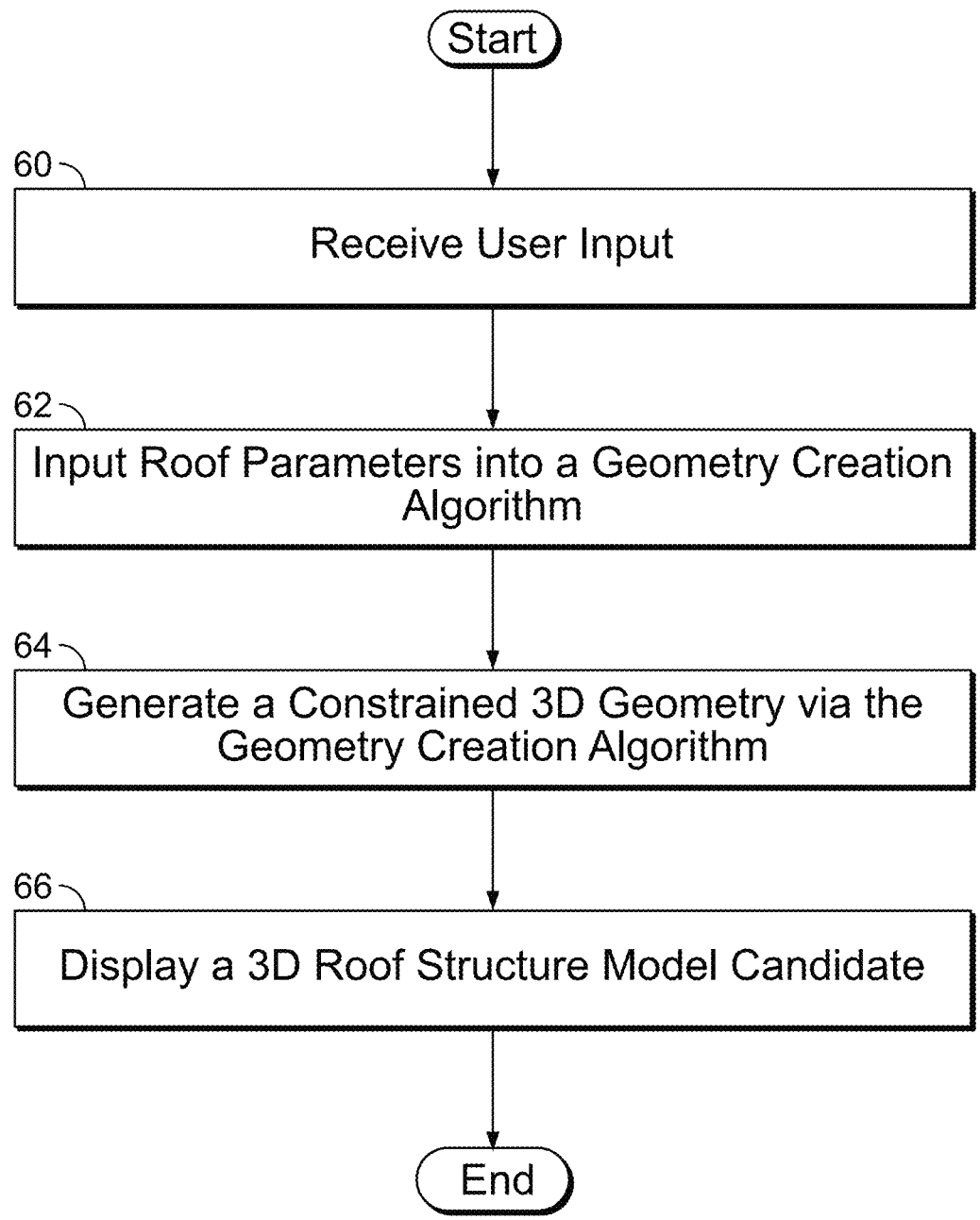
FIG. 5 is a flowchart illustrating step 52 of FIG. 4 in greater detail.

FIG. 5 is a flowchart illustrating step 52 of FIG. 4 in greater detail. In particular, FIG. 5 illustrates processing steps carried out by the system 10 for parameterizing a roof structure present in an aerial image using roof components. Beginning in step 60, the system 10 receives a user input. The user input can include an identification of one or more roof components present in an aerial image, roof parameters, roof constraints, or any combination thereof. The roof parameters and roof constraints can be used to generate a roof component(s). The input can be received through a command-line interface, a graphical user interface, or any other suitable method. In step 62, the system 10 inputs the roof components into a geometry creation algorithm ("GCA"). In step 64, the system generates a constrained 3D geometry via the GCA. Lastly, in step 66, the system 10 displays a 3D roof structure model candidate. The 3D roof structure model can be composed of points, vertices, line segments, surfaces, etc.

A parametric roof representation refers to the construction of a roof structure model with different degrees of complexity utilizing a small set of parameters. This representation provides for a constructed 3D roof structure model candidate to adhere to a particular set of rules and geometrical restrictions required for VNS to apply a local search procedure to determine an optimal 3D roof structure model. FIGS. 6A-6C are diagrams illustrating an example parametric roof representation of a gable roof. FIG. 6A illustrates a generated 3D gable roof structure model 72 of a building 70 and FIG. 6B illustrates a 2D diagram of the 3D gable roof structure model 72 of FIG. 6A. As shown in FIG. 6B, the gable roof comprises two rectangular planes having a plurality of rakes 78, two eaves 80 and a ridge 82. The rakes 78 are defined by line segments A-AB, AB-B, D-CD and CD-C, the eaves 80 are defined by line segments A-D and B-C and the ridge 82 is defined by the line segment AB-CD. FIG. 6C illustrates a parametric representation of the 3D gable roof structure model 72 of FIG. 6A. As shown in FIG. 6C, a gable roof is defined by utilizing seven continuous parameters: a ridge vertex location ($X_{AB}$, $Y_{AB}$, $Z_{AB}$), a roof orientation or azimuth (a), a length of the ridge (1), a roof width (w) and an eave height ($Z_{EAVE}$). Modifying any of these parameters provides for constructing a new 3D gable roof structure model derived from the original 3D gable roof structure model. The same applies to other roof structure types including, but not limited to, a hip-roof, a gablet, a mansard, etc. and to their combinations in arbitrarily complex roofs composed of multiple roof structure types. Accordingly, a complex roof can be described by a fixed-size vector of continuous variables indicative of the parameters controlling and defining a roof structure.

The system 10 utilizes the VNS metaheuristic method to optimize a 3D roof structure model candidate and, as such, each 3D roof structure model candidate must be scored to determine whether a particular 3D roof structure model candidate can be considered "better than" a previously computed 3D roof structure model candidate. Accordingly, the VNS metaheuristic model requires determining a weight or cost function to evaluate an accuracy of each 3D roof structure model candidate. The system 10 utilizes a weight function that relies on basic image information. Intuitively, a 3D roof structure model candidate projected onto an image should closely resemble the image gradients and roof edges of the roof structure present in the image. The closer the projected roof lines (i.e., 2D segments) of the 3D roof structure model candidate are to those image features, the greater weight will be assigned to the candidate solution.

Figure 7A:
FIGS. 7A-7C are diagrams illustrating a weighting function carried out by the system of the present disclosure.
Figure 7B:
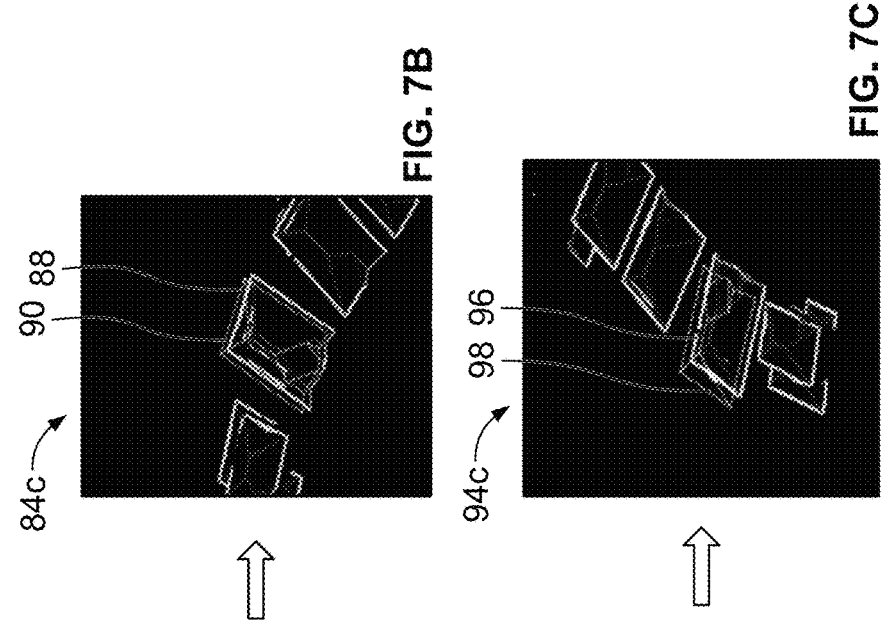
Figure 7C:
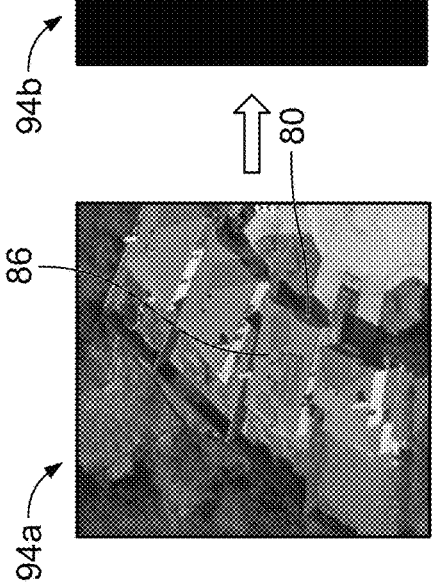

FIGS. 7A-7C are diagrams illustrating a weight function carried out by the system 10 of the present disclosure. In particular, FIG. 7A illustrates a generated 3D roof structure model 82 of a building 80 and FIGS. 7B and 7C illustrate carrying out the weight function for the 3D roof structure model 82 for different images views of the building 80. Referring to FIG. 7B, image 84*a* illustrates a perspective view of a roof structure 86 of the building 80 and image 84*b* illustrates 2D roof segments 88 corresponding to the roof structure 86 and extracted from the image 84*a*. Lastly, image 84*c* illustrates 3D roof segments 90 corresponding to the 3D roof structure model 82 projected onto the 2D roof segments 88. Referring to FIG. 7C, image 94*a* illustrates another perspective view of the roof structure 86 of the building 80 and image 94*b* illustrates 2D roof segments 96 corresponding to the roof structure 86 and extracted from the image 94*a*. Lastly, image 94*c* illustrates 3D roof segments 98 corresponding to the 3D roof structure model 82 projected onto the 2D roof segments 96. As discussed above, an optimal 3D roof structure model should align with the 2D roof segments extracted from an image.

Figure 8:
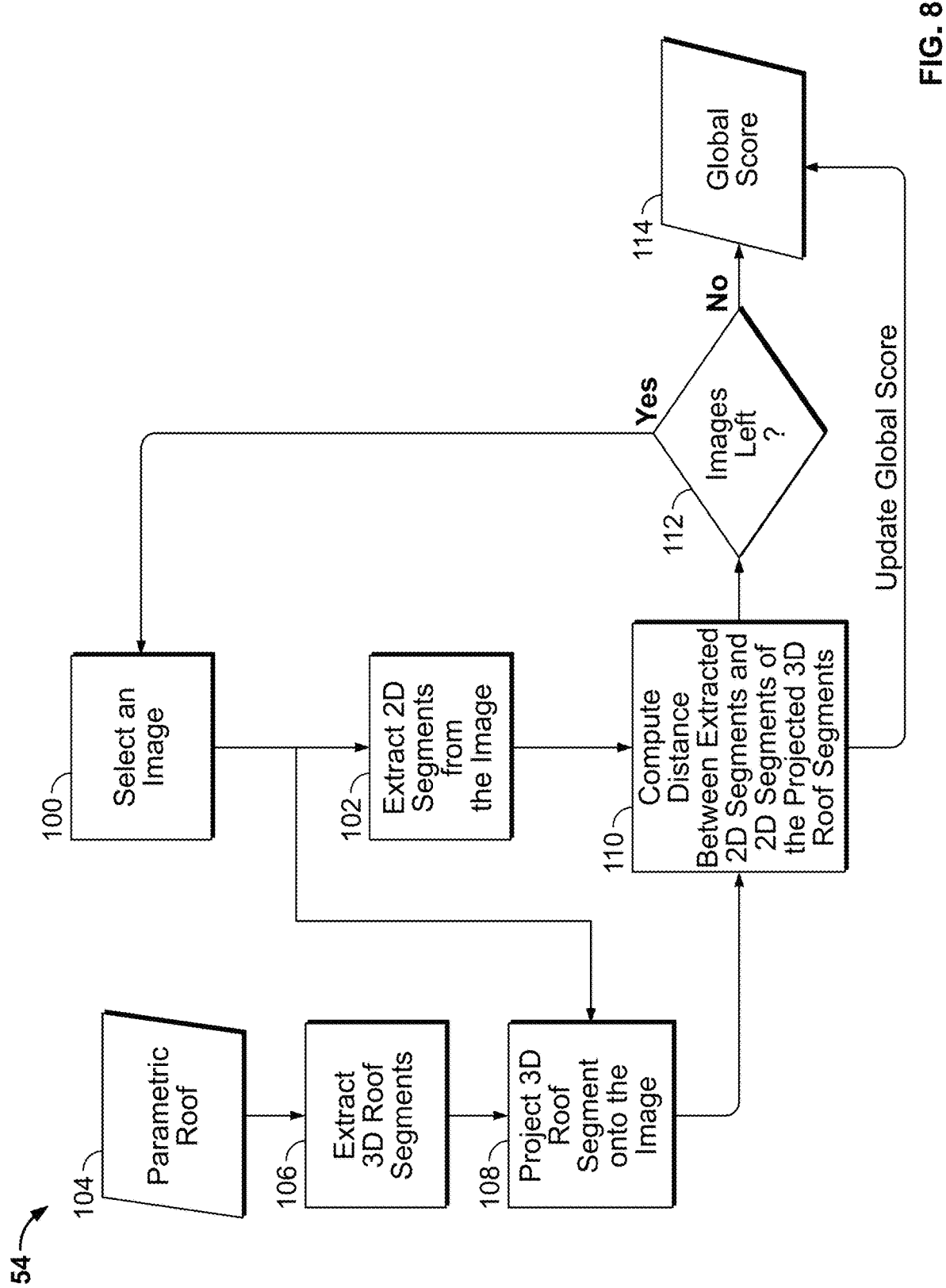
FIG. 8 is a flowchart illustrating processing step 54 of FIG. 4 in greater detail.

FIG. 8 is a flowchart illustrating processing step 54 of FIG. 4 in greater detail, in which the system 10 scores a 3D roof structure model candidate. Beginning in step 100, the system 10 selects an image having a roof structure present therein. In step 102, the system 10 extracts 2D roof segments corresponding to the roof structure present in the image. It is noted that traditional computer vision algorithms or complex neural networks can be utilized to extract the 2D roof segments corresponding to the roof structure present in the image.

In step 104, the system 10 obtains a generated 3D roof structure model candidate corresponding to the roof structure present in the image or obtains a stored 3D roof structure model candidate from the 3D roof structure model database 14. Then, in step 106, the system 10 extracts 3D roof segments from the 3D roof structure model candidate. In particular, given a set of roof parameters, the system 10 transforms the 3D roof structure model candidate into a set of vertices, segments and faces (e.g., a 3D roof structure wireframe model). A segment-based representation is selected for scoring the 3D roof structure model candidate. Next, in step 108, the extracted 3D candidate roof segments are projected onto the image.

In step 110, the system 10 compares the extracted 2D segments from the image and 2D segments of the extracted candidate 3D roof segments projected onto the image. In particular, the system 10 determines a distance between the extracted 2D segments from the image and the extracted 2D segments of the extracted candidate 3D roof segments projected onto the image to determine a score of the 3D roof structure model candidate. Then, the system 10 updates a global score with the determined score of the 3D roof structure model candidate. In step 112, the system 10 determines whether all images have been processed. If all images have not been processed, then the process returns to step 100 to select and process a new image. Alternatively, if all images have been processed, then the process proceeds to step 114. In step 114, the scores of the 3D roof structure model candidates are averaged to yield a weight for the 3D roof structure model candidate. As discussed above, a 3D roof structure model candidate projected onto an image should closely resemble the image gradients and roof edges of the roof structure present in the image. In particular, the smaller the distance between those image features and the extracted 2D segments of the extracted candidate 3D roof segments projected onto the image, the greater weight (i.e., confidence) will be assigned to the 3D roof structure model candidate.

Figure 9:
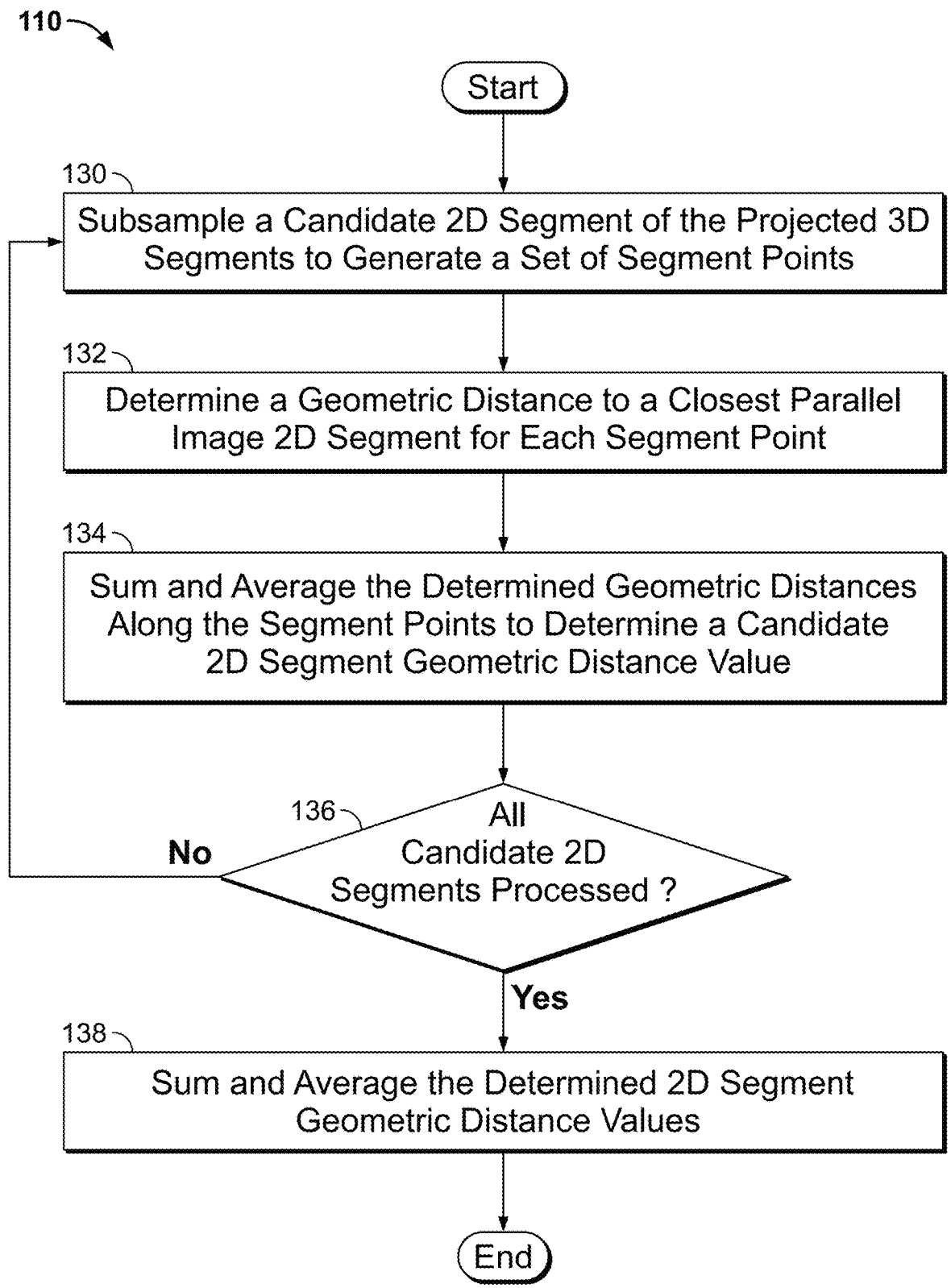
FIG. 9 is a flowchart illustrating processing step 110 of FIG. 8 in greater detail.

FIG. 9 is a flowchart illustrating processing step 110 of FIG. 8 in greater detail, in which the system 10 determines distance values between a set of 2D segments extracted from an image and 2D segments of extracted candidate 3D roof segments projected onto the image. Beginning in step 130, the system 10 subsamples a candidate 2D segment to generate a set of segment points. In step 132, the system 10 determines a geometric distance to a closest parallel image 2D segment for each segment point. Then, in step 134, the system 10 sums and averages the determined geometric distances for the segment points to yield a geometric distance value (i.e., a score) for the candidate 2D segment. In step 136, the system 10 determines whether all candidate 2D segments have been processed. If all candidate 2D segments have not been processed, then the process returns to step 130 to select and process another candidate 2D segment. Alternatively, if all candidate 2D segments have been processed, then the process proceeds to step 138. In step 138, the system sums and averages the geometric distance values of the respective candidate 2D segments to yield a score for the 3D roof structure model candidate.

Figure 10A:
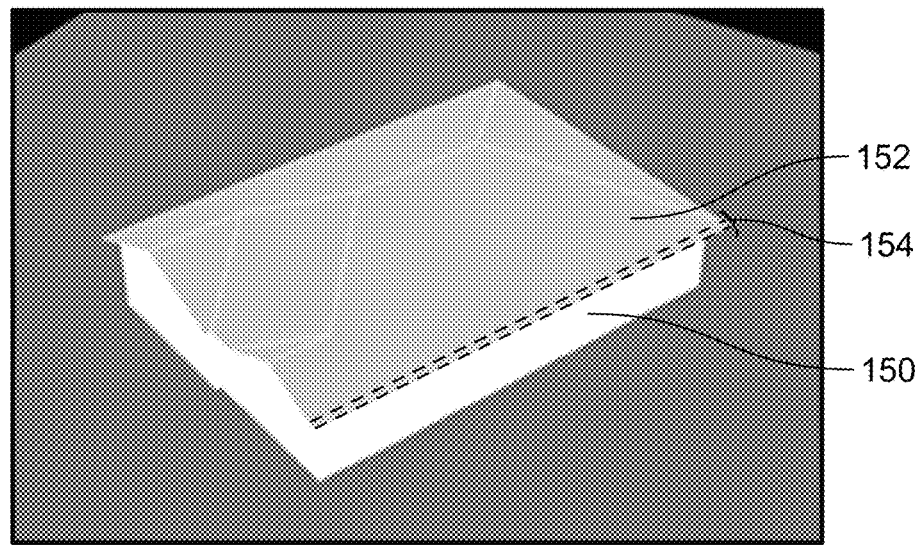
FIGS. 10A-10E are diagrams illustrating the processing steps of FIG. 9.
Figure 10B:
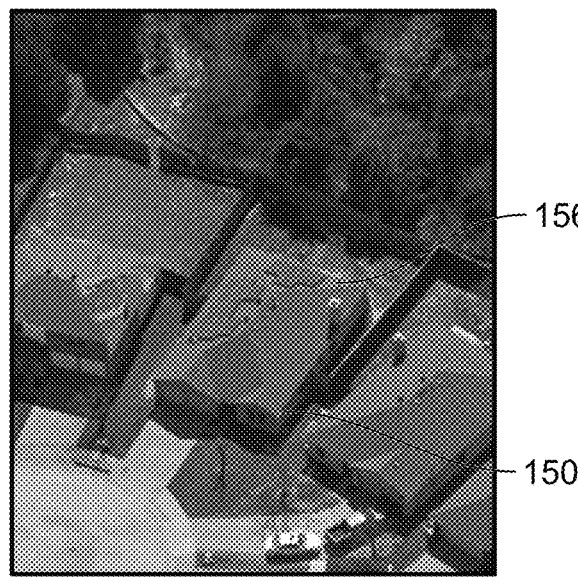
Figure 10C:
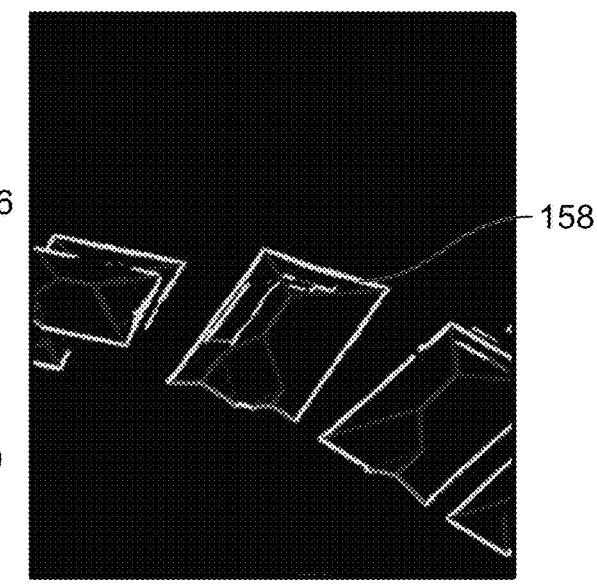

FIGS. 10A-10E are diagrams illustrating the processing steps of FIG. 9. FIG. 10A illustrates a 3D roof structure model candidate 152 of a building 150 and a candidate 2D segment 154 of the 3D roof structure model candidate 152. FIG. 10B illustrates a selected image 155 showing a perspective view of a roof structure 156 of the building 150. FIG. 10C illustrates extracted 2D roof segments 158 corresponding to the roof structure 156 of the building 150 present in the image 155 of FIG. 10B. It is noted that traditional computer vision algorithms or complex neural networks can be utilized to extract 2D roof segments from the image 155.

Figure 10E:
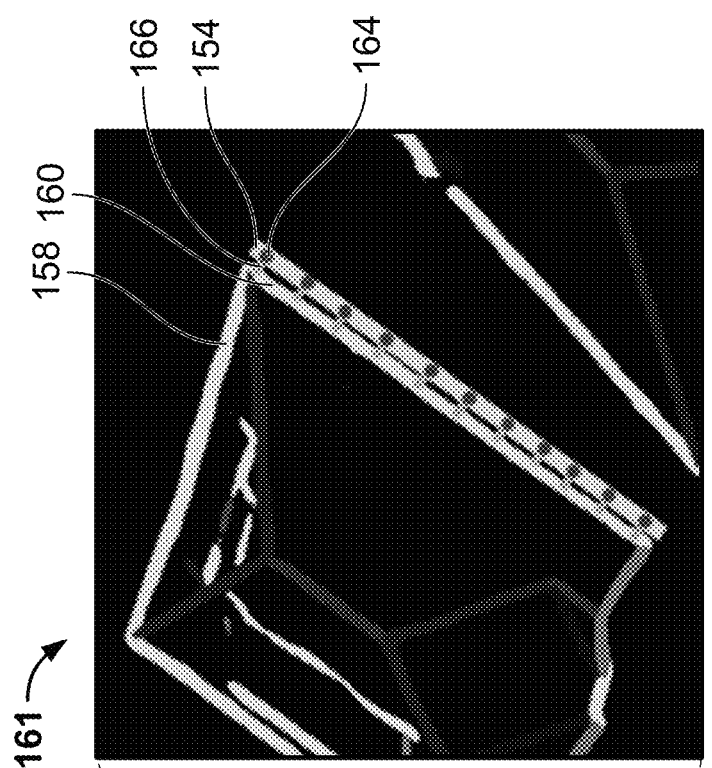
Figure 10D:
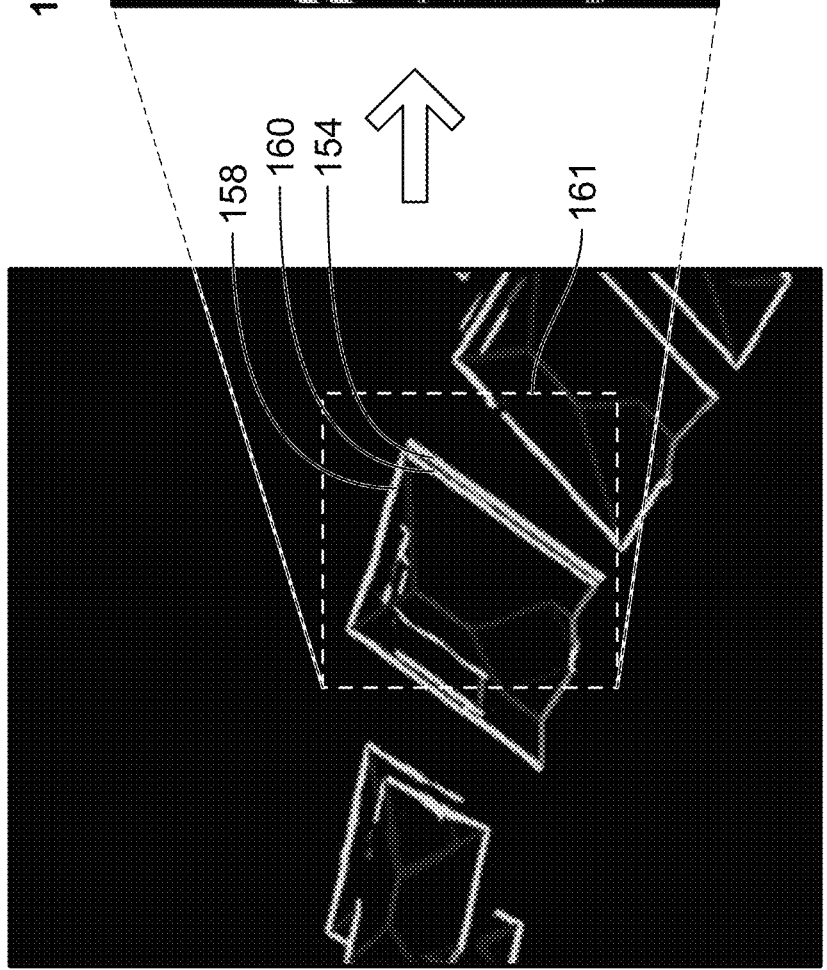

FIG. 10D illustrates a view 161 of a projection of the candidate 2D segment 154 onto the extracted 2D roof segments 158 corresponding to the roof structure 156 of the building 150 present in the image 155 of FIG. 10B. In particular, FIG. 10D illustrates a comparison of the 2D roof segment 160 of the extracted 2D roof segments 158 with the projected candidate 2D segment 154. As shown in FIG. 10D, the projected candidate 2D segment 154 is parallel to but not aligned with the 2D roof segment 160. FIG. 10E illustrates a magnified view of the view 161 of FIG. 10D. As shown in FIG. 10E, the system 10 subsamples the candidate 2D segment 154 to generate a set of segment points 164 and determines a geometric distance 166 to the 2D roof segment 160 for each segment point 164.

FIG. 11 is a flowchart illustrating step 56 of FIG. 4 in greater detail, in which the system 10 applies VNS 183 using a best improvement local search procedure to transform a 3D roof structure model candidate (i.e., a sub-optimal candidate) to an optimal 3D roof structure model. It is noted that VNS 183 can utilize other search procedures including, but not limited to, first improvement, neighborhood change, etc. Beginning in step 180, the system 10 obtains a generated 3D roof structure model candidate corresponding to a roof structure present in a set of images 180 or obtains a stored 3D roof structure model candidate from the 3D roof structure model database 14. The 3D roof structure model candidate may not align with the roof structure present in each image (i.e., the 3D roof structure model candidate is a sub-optimal solution).

In step 184, given the set of images 180 and the 3D roof structure model candidate 182 as inputs, the system 10 applies VNS 183 using the best improvement local search procedure. In particular, the neighborhood structure is initialized to $N_1$ (i.e., k=1) and all possible solutions in the neighborhood structure $N_1$ are weighted. It is noted that for VNS, the neighborhood structure refers to a number of parameters to be modified simultaneously. Therefore, when VNS 183 executes the best improvement local search procedure over the 3D roof structure model candidate utilizing the neighborhood structure $N_1$, only one roof parameter is modified to yield a 3D roof structure model candidate solution. Accordingly, a neighborhood structure $N_2$ requires the modification of two roof parameters, a neighborhood structure $N_3$ requires the modification of three roof parameters, a neighborhood structure $N_4$ requires the modification of four roof parameters, and so on. A parameter modification refers to the application of an offset to a current parameter value. It is noted that each parameter can have a different offset value based on a respective unit of measurement. For example, a ridge_length parameter expressed in meters should be increased or decreased using a different offset value than an azimuth parameter expressed in radians.

In step 186, VNS 183 determines whether a candidate solution in the neighborhood structure $N_1$ improves upon the 3D roof structure model candidate (i.e., the incumbent candidate). If VNS 183 determines that a candidate solution in the neighborhood structure $N_1$ improves upon the 3D roof structure model candidate, then VNS 183 replaces the 3D roof structure model candidate with the neighborhood structure $N_1$ candidate solution. Then, the process returns to step 184 to execute a new best improvement local search procedure over the neighborhood structure $N_1$ candidate solution utilizing the neighborhood structure $N_1$. Alternatively, if the system 10 determines that a candidate solution in the neighborhood structure $N_1$ does not improve upon the 3D roof structure model candidate, then the process proceeds to step 188.

In step 188, VNS 183 determines whether a maximum number of neighborhood structures (i.e., $k=k_{max}$) has been utilized. If the maximum number of neighborhood structures has not been utilized, then VNS 183 increments the neighborhood structure (i.e., k=k+1). Subsequently, the process returns to step 184 to execute a new best improvement local search procedure over the neighborhood structure $N_1$ candidate solution utilizing a neighborhood structure $N_2$. It is understood that if VNS 183 determines that a candidate solution in the neighborhood structure $N_2$ improves upon the neighborhood structure $N_1$ candidate solution, then the process returns to the initial neighborhood structure $N_1$ to execute a new best improvement local search procedure over the neighborhood structure $N_2$ candidate solution. Alternatively, if the maximum number of neighborhood structures has been utilized, then the process proceeds to step 190. In step 190, an optimal 3D roof structure model is realized. In particular, the optimal 3D roof structure model is indicative of an iteration that cannot be further improved and an improvement of the 3D roof structure model candidate.

FIGS. 12A-12D and FIGS. 13A-13D are diagrams illustrating 3D roof structure model optimization processing results generated by the system 10 of the present disclosure, in which VNS 183 has been applied to a plurality of 3D roof structure model candidates 212, 222, 232, 242, 252, 262, 272 and 282. In particular, FIGS. 12A-12D respectively illustrate 3D roof structure model candidates 212, 222, 232 and 242 corresponding to a roof structure of building 211 in respective image views 210a, 220a, 230a and 240a and their corresponding optimal 3D roof structure models 216, 226, 236 and 246 in respective image views 210b, 220b, 230b and 240b.

Figure 12A:
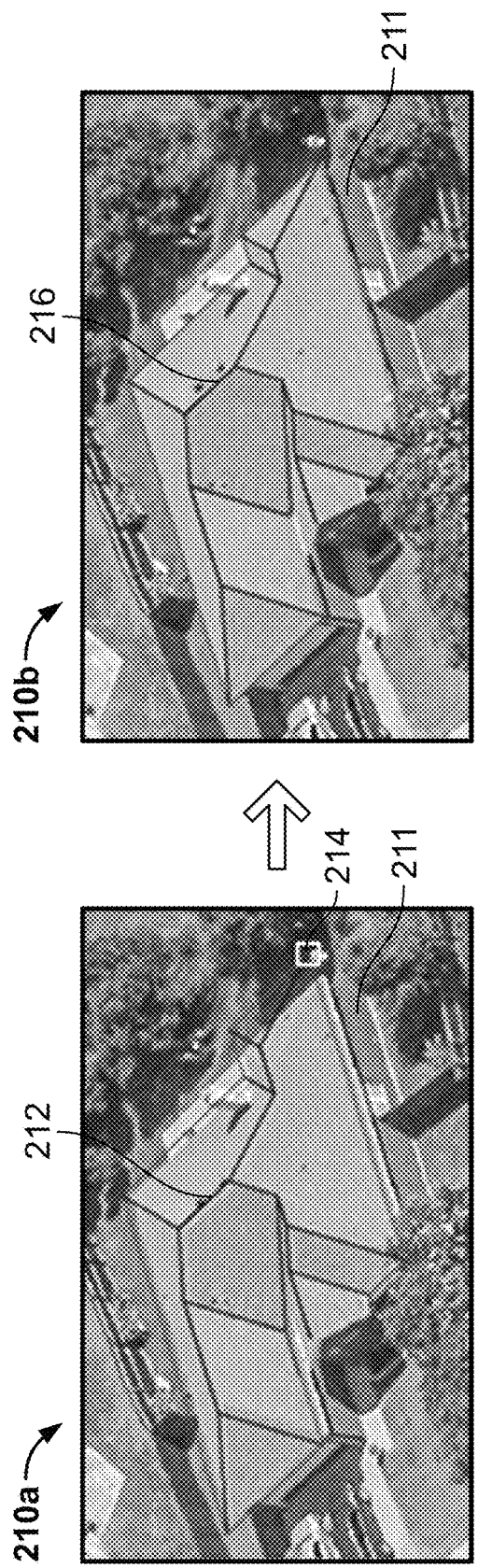
Figure 12B:
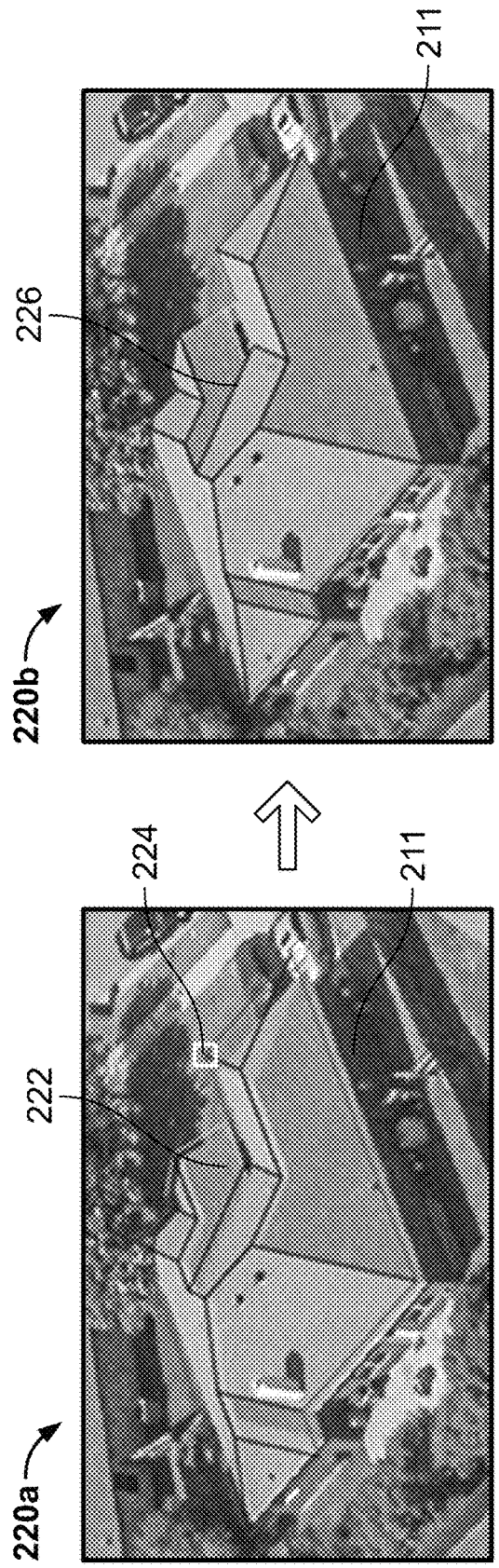

For example, FIG. 12A illustrates that line segment 214 of 3D roof structure model candidate 212 does not substantially align with the roof structure of building 211 in image 210a but that after application of VNS 183 to the 3D roof structure model candidate 212, the generated optimal 3D roof structure model 216 aligns with the roof structure of building 211 in image 210b. FIG. 12B illustrates that line segment 224 of 3D roof structure model candidate 222 does not substantially align with the roof structure of building 211 in image 220a but that after application of VNS 183 to the 3D roof structure model candidate 222, the generated optimal 3D roof structure model 226 aligns with the roof structure of building 211 in image 220b. FIG. 12C illustrates that line segment 234 of 3D roof structure model candidate 232 does not substantially align with the roof structure of building 211 in image 230a but that after application of VNS 183 to the 3D roof structure model candidate 232, the generated optimal 3D roof structure model 236 aligns with the roof structure of building 211 in image 230b. FIG. 12D illustrates that line segment 244 of 3D roof structure model candidate 242 does not substantially align with the roof structure of building 211 in image 240a but that after application of VNS 183 to the 3D roof structure model candidate 242, the generated optimal 3D roof structure model 246 aligns with the roof structure of building 211 in image 240b.

Figure 13A:
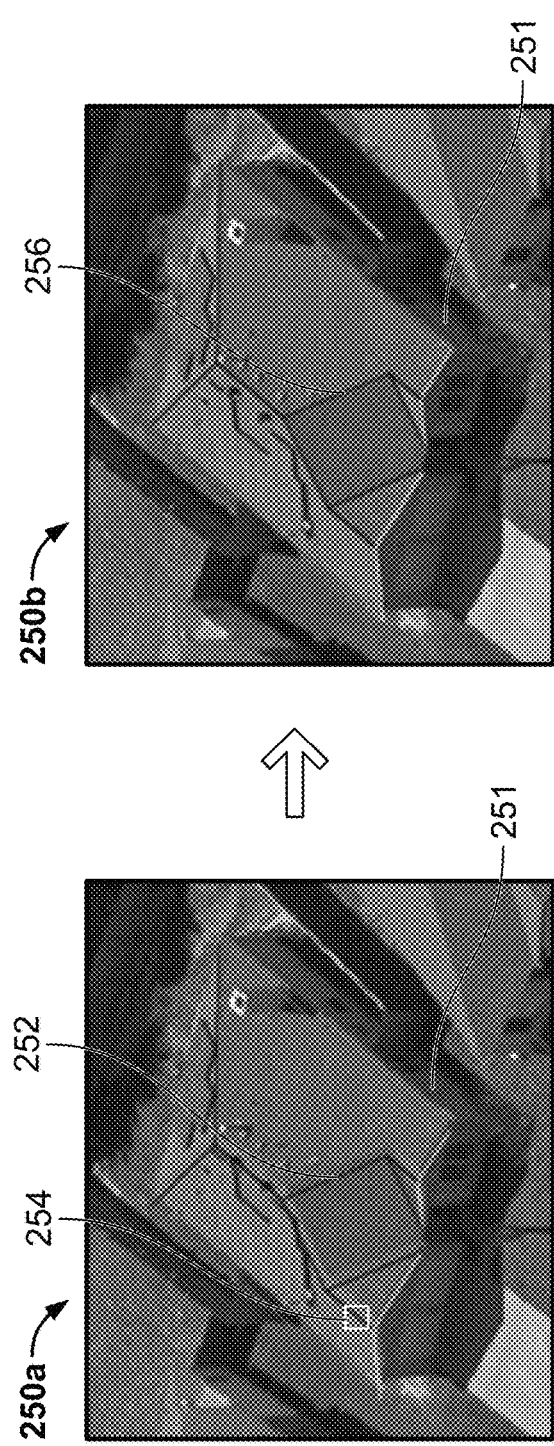
FIGS. 13A-13D are diagrams illustrating 3D model optimization processing results generated by the system of the present disclosure.
Figure 13B:
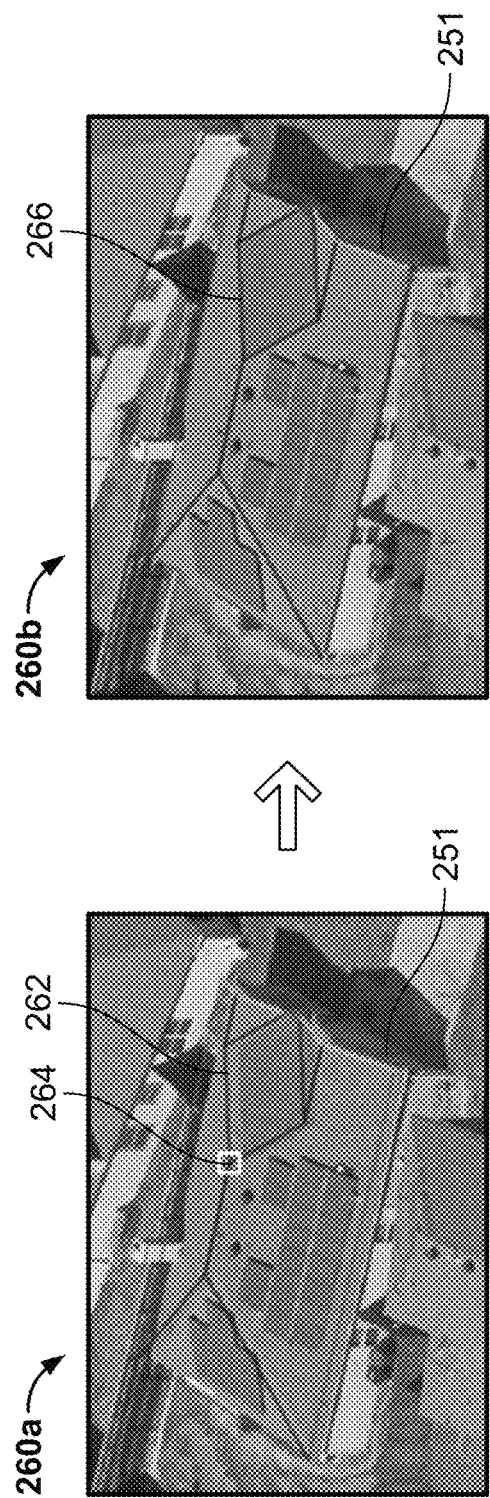
Figure 13C:
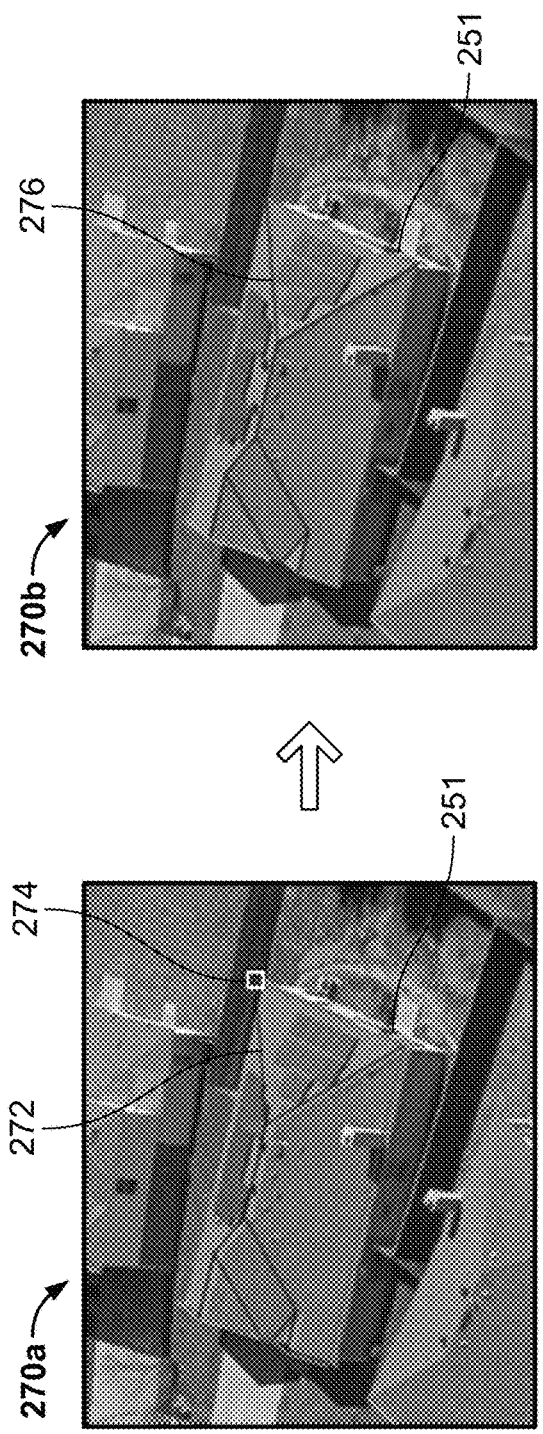
Figure 13D:
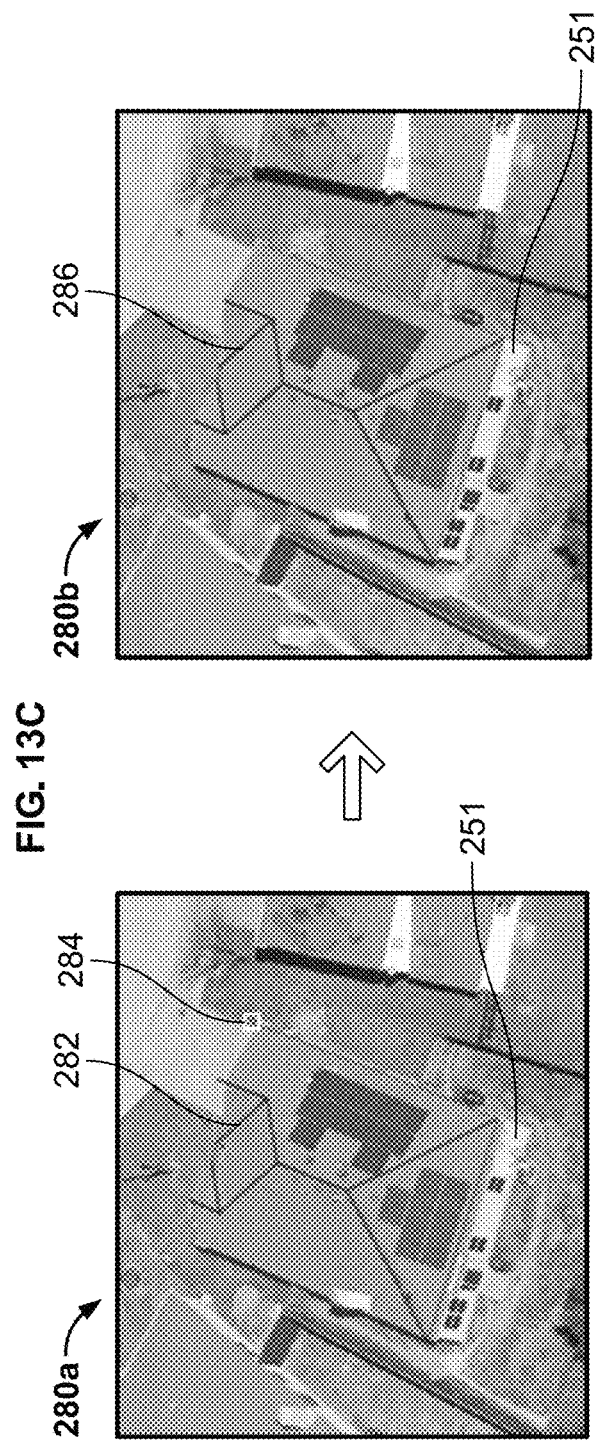

FIGS. 13A-13D respectively illustrate 3D roof structure model candidates 252, 262, 272 and 282 corresponding to a roof structure of building 251 in respective image views 250a, 260a, 270a and 280a and their corresponding optimal 3D roof structure models 256, 266, 276 and 286 in respective image views 250b, 260b, 270b and 280b. For example, FIG. 13A illustrates that line segment 254 of 3D roof structure model candidate 252 does not substantially align with the roof structure of building 251 in image 250a but that after application of VNS 183 to the 3D roof structure model candidate 252, the generated optimal 3D roof structure model 256 aligns with the roof structure of building 251 in image 250b. FIG. 13B illustrates that line segment 264 of 3D roof structure model candidate 262 does not substantially align with the roof structure of building 251 in image 260a but that after application of VNS 183 to the 3D roof structure model candidate 262, the generated optimal 3D roof structure model 266 aligns with the roof structure of building 251 in image 260b. FIG. 13C illustrates that line segment 274 of 3D roof structure model candidate 272 does not substantially align with the roof structure of building 251 in image 270a but that after application of VNS 183 to the 3D roof structure model candidate 272, the generated optimal 3D roof structure model 276 aligns with the roof structure of building 251 in image 270b. FIG. 13D illustrates that line segment 284 of 3D roof structure model candidate 282 does not substantially align with the roof structure of building 251 in image 280a but that after application of VNS 183 to the 3D roof structure model candidate 282, the generated optimal 3D roof structure model 286 aligns with the roof structure of building 251 in image 280b.

Figure 14:
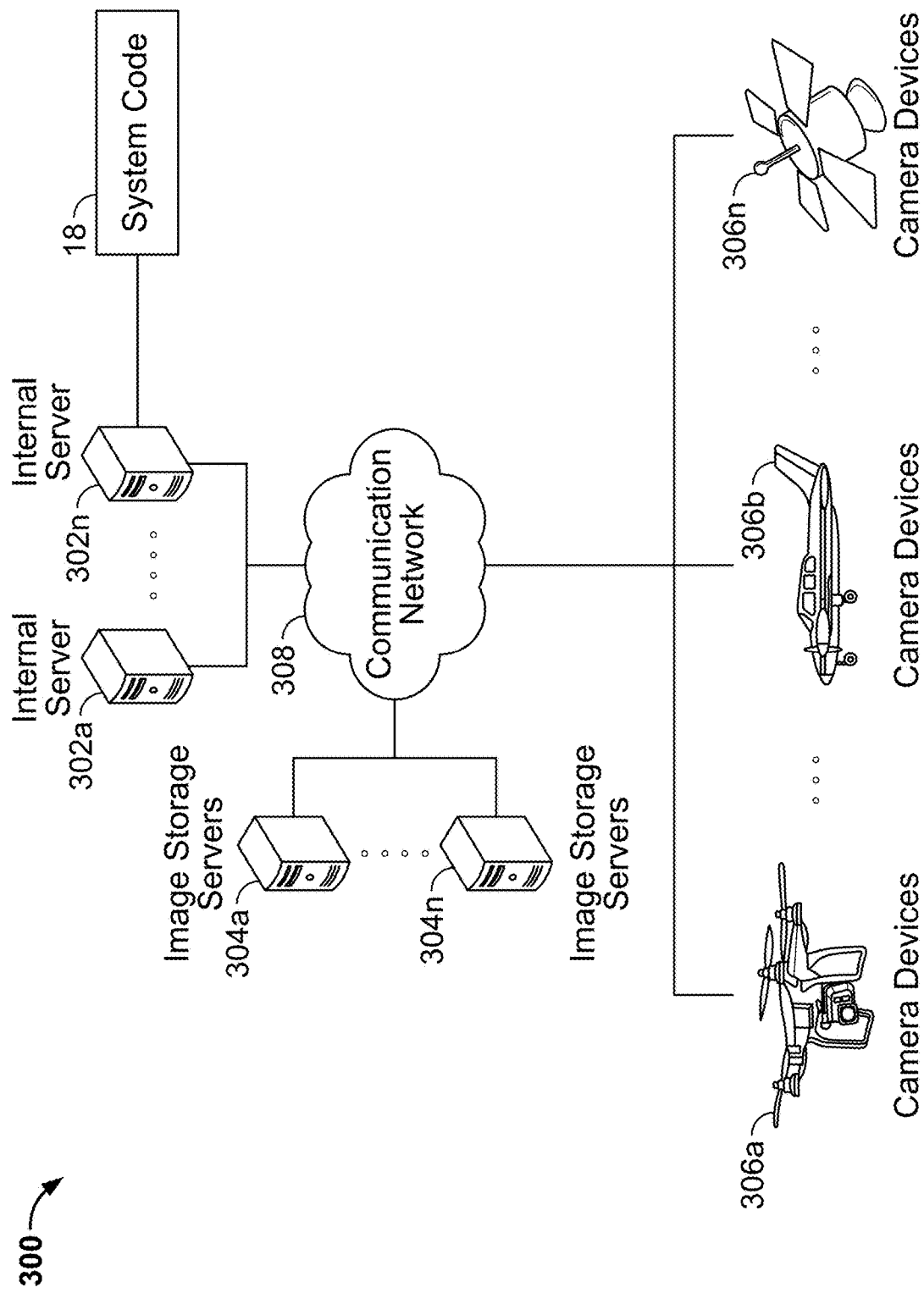
FIG. 14 a diagram illustrating another embodiment of the system of the present disclosure.

FIG. 14 a diagram illustrating another embodiment of the system 300 of the present disclosure. In particular, FIG. 14 illustrates additional computer hardware and network components on which the system 300 could be implemented. The system 300 can include a plurality of internal servers 302a-302n having at least one processor and memory for executing the computer instructions and methods described above (which could be embodied as system code 18). The system 300 can also include a plurality of image storage servers 304a-304n for receiving image data and/or video data. The system 300 can also include a plurality of camera devices 306a-306n for capturing image data and/or video data. For example, the camera devices can include, but are not limited to, a unmanned aerial vehicle 306a, an airplane 306b, and a satellite 306n. The internal servers 302a-302n, the image storage servers 304a-304n, and the camera devices 306a-306n can communicate over a communication network 308. Of course, the system 300 need not be implemented on multiple devices, and indeed, the system 300 could be implemented on a single computer system (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those dis- cussed above, are intended to be included within the scope of the disclosure. What is desired to be protected by Letters Patent is set forth in the following claims.

What is claimed is:

1. A method for fine adjustment of a computerized roof model, comprising the steps of:
    generating by a processor a computerized three-dimensional (3D) roof model;
    weighing a plurality of candidate 3D roof structure models;
    selecting one of the plurality of candidate 3D roof structure models having a highest weight among the plurality of candidate 3D roof structure models;
    optimizing the selected one of the plurality of candidate 3D roof structure models to create an optimal 3D roof structure model using a metaheuristic search method applied to the selected one of the plurality of candidate 3D roof structure models and executed by the processor; and
    displaying the optimal 3D roof structure model superimposed over an image of a structure,
    wherein the metaheuristic search method projects each of the plurality of candidate 3D roof structure models onto the image and weighs each model based on image gradients and roof edges of a roof structure present in the image.

2. The method of claim 1, wherein the step of optimizing the selected one of the plurality of candidate 3D roof structure models comprises performing a best improvement local search on a set of image lines and at least one of the plurality of candidate 3D roof structure models.

3. The method of claim 1, wherein the step of generating the 3D roof model comprises receiving user input indicating at least one of a roof component present in an aerial image, a roof parameter, or a roof constraint.

4. The method of claim 3, wherein the step of generating the 3D roof model comprises processing roof parameters using a geometry creation algorithm.

5. The method of claim 4, wherein the step of generating the 3D roof model comprises generating a constrained 3D geometry via the geometry creation algorithm.

6. The method of claim 5, wherein the step of generating the 3D roof model comprises displaying a 3D roof structure model candidate.

7. A system for fine adjustment of a computerized roof model, comprising:
    a database storing a plurality of candidate 3D roof structure models; and
    a processor in communication with the database, the processor programmed to perform the steps of:
        generating a computerized three-dimensional (3D) roof model;
        weighing the plurality of candidate 3D roof structure models;
        selecting one of the plurality of candidate 3D roof structure models having a highest weight among the plurality of candidate 3D roof structure models;
        optimizing the selected one of the plurality of candidate 3D roof structure models to create an optimal 3D roof structure model using a metaheuristic search method applied to the selected one of the plurality of candidate 3D roof structure models and executed by the processor; and
        displaying the optimal 3D roof structure model superimposed over an image of a structure,
    wherein the metaheuristic search method projects each of the plurality of candidate 3D roof structure models onto the image and weighs each model based on image gradients and roof edges of a roof structure present in the image.

8. The system of claim 7, wherein the step of optimizing the selected one of the plurality of candidate 3D roof structure models comprises performing a best improvement local search on a set of image lines and at least one of the plurality of candidate 3D roof structure models.

9. The system of claim 7, wherein the step of generating the 3D roof model comprises receiving user input indicating at least one of a roof component present in an aerial image, a roof parameter, or a roof constraint.

10. The system of claim 9, wherein the step of generating the 3D roof model comprises processing roof parameters using a geometry creation algorithm.

11. The system of claim 10, wherein the step of generating the 3D roof model comprises generating a constrained 3D geometry via the geometry creation algorithm.

12. The system of claim 11, wherein the step of generating the 3D roof model comprises displaying a 3D roof structure model candidate.

* * * * *